United States Patent Office 3,487,071
Patented Dec. 30, 1969

3,487,071
3-BLOCKED AMINO-Δ$^{1,4}$-2-AZETIDINONES
John Clark Sheehan, Lexington, Mass., assignor to Bristol-Myers Company, New York, N.Y., a corporation of Delaware
No Drawing. Original application Jan. 14, 1966, Ser. No. 520,662. Divided and this application Dec. 23, 1968, Ser. No. 786,418
Int. Cl. C07d 25/02
U.S. Cl. 260—239                    6 Claims

ABSTRACT OF THE DISCLOSURE 3-phthalimido-4-mercapto-2-azetidinone, 3-phthalimido-Δ$^{1,4}$-2-azetidinone and similar coupounds in which the phthalimido group is replaced by tritylamino, carbobenzyloxyamino and the like are synthesized and used as intermediates in the synthesis of penicillins and cephalosporins and of 3 - amino - 4 - mercapto-azetidinone which is used, inter alia, in preparing amine fluosilicate mothproofing agents and amine thicyanateformaldehyde condensation products for use as pickling inhibitors.

This application is a division of my prior, co-pending application Ser. No. 520,662 filed Jan. 14, 1966.

SUMMARY OF THE INVENTION

This invention relates to certain novel compounds useful as intermediates in the synthesis of antibacterial agents such as penicillins and cephalosporins and, more particularly, to certain substituted unfused β-lactam rings, i.e. to certain 3-amino-2-azetidinones which may contain unsaturation or substitution of sulfhydryl at the 4-position or substituents on the 3-amino group.

The production of antibacterial agents such as penicillins and particularly cephalosporins by fermentation techniques, either directly or via 6-aminopenicillanic acid or 7-aminocephalosporanic acid, has certain inherent limitations with respect to the facilities required and the compounds which can be produced. It was the object of the present invention to provide alternative intermediates useful in the production of penicillins and cephalosporins by further chemical reactions.

The objective of the present invention was achieved by the production and provision, according to the present invention, of the compounds of the formula

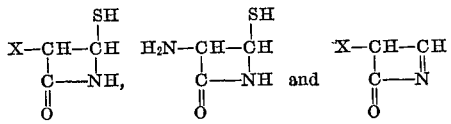

wherein X represents a "blocked" primary amino group as the term is used in the field of peptide synthesis, e.g. phthalimido, tritylamino, o-nitrophenoxyacetamido, o-nitrophenylsulfenylamino, carbobenzyloxyamino, formylamino, carbo-t-butyloxyamino. Of these compounds, the compound having a free primary amino group is sufficiently basic to form acid addition salts and such salts are part of the present invention.

The acid addition salts can be prepared by conventional methods. For example, 3-amino-4-mercapto-2-azetidinone can be treated with at least a stoichiometric amount of the appropriate acid; and depending upon the nature of the solvent employed, the desired salt will separate spontaneously or can be precipitated by the addition of a solvent in which the salt is insoluble. A pharmacologically acceptable acid addition salt can be prepared using acids such as sulfuric, hydrochloric, hydrobromic, nitric, phosphoric, benzoic, p-toluenesulfonic, salicylic, acetic, propionic, tartaric, citric, succinic acids, and the like. Likewise, 3-amino-4-mercapto-2-azetidinone can be reacted with fluosilicic acid in accordance with U.S. Patents 1,915,334 and 2,075,359 for preparing amine fluosilicate mothproofing agents, and in accordance with U.S. Patents 2,425,320 and 2,606,115 in preparing amine thicyanate-formaldehyde condensation products for use as pickling inhibitors. The acid addition salts of this invention provide a convenient means for refining the free base, and any acid that will form the acid addition salt is suitable. Representative suitable acids include picric, oxalic and α-naphthoic.

The present invention includes a number of processes for the production of these compounds. These processes are presented below in summary form in the customary manner wherein X has the meaning set out above, as follows:

Process No. 1

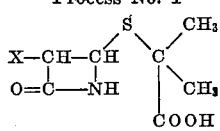

This starting material is prepared from the appropriate 6-"blocked" aminopenicillanic acid according to the procedures reported by Sheehan et al., J. Amer. Chem. Soc. 87, 5468–5469 (Dec. 5, 1965) for the case where X is phthalimido; see also Y. G. Perron et al., J. Med. Soc. 7, 483–487 (1964).

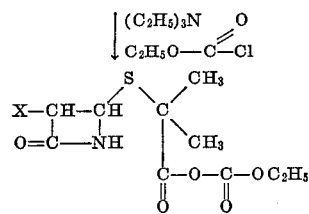

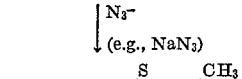

Curtius Reaction, i.e., —N$_2$ by heat

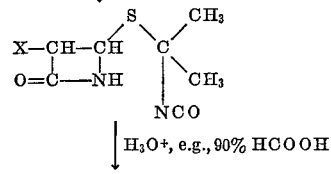

H$_3$O$^+$, e.g., 90% HCOOH

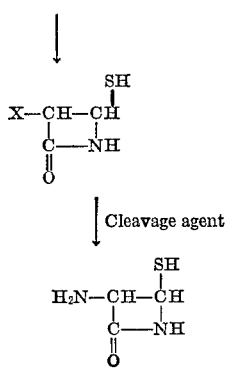

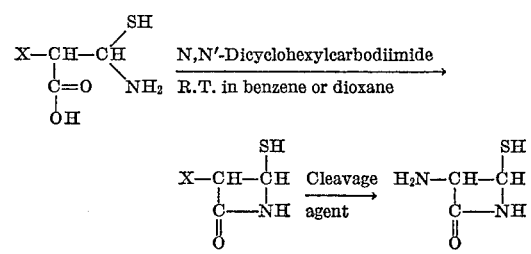

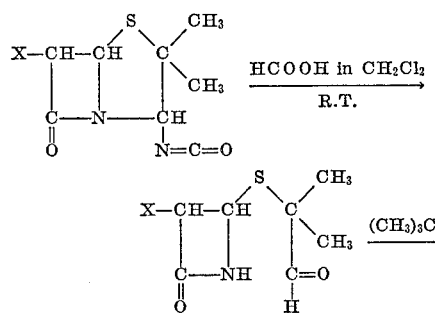

In the final step when the blocked amino group X represents phthalimido, it is converted to primary amino by treatment with hydrazine hydrate in dioxane at about room temperature for at least twelve hours. When X represents carbobenzyloxyamino the blocked amino group is converted to a primary amino group by catalytic hydrogenation to leave the product, 3-amino-4-mercapto-2-azetidinone. When the blocked amino group is formyl or carbo-t-butyloxyamino or o-nitrophenylsulfenylamino it is converted to primary amino either by reaction with anhydrous hydrogen chloride in a non-protonating solvent such as benzene or methylene chloride or by reaction with trifluoroacetic acid. The tritylamino compound can also be converted to the free amino compound by treatment of a solution in acetone with p-toluenesulfonic acid monohydrate to give the free primary amine in the form of its p-toluenesulfonate salt; see B. K. Koe, Nature, 195, 1200 (1963). In addition, when the blocked amino group is tritylamino or carbo-t-butyloxyamino, the final two reactions are conducted in one step by the use of stronger acid for longer periods of time and, if desired, at higher temperatures.

When the blocked amino group X is o-nitrophenoxyacetamido it is converted to a primary amino group to produce 3-amino-4-mercapto-2-azetidinone by *either* (a) catalytic hydrogenation (e.g. in water at room temperature using 30% Pd-on-diatomaceous earth) followed by allowing the mixture to stand at an acidic pH (e.g. in water acidified to pH 2 with 20% hydrochloric acid at about 10° C. for at least 20 minutes or at 25° C. for at least 24 hours) *or* (b) by adding the blocked compound (e.g. 7 millimoles) in cold water, e.g. 30 ml. rapidly, e.g. over 1–3 minutes, to 5% Pd-C (e.g. 0.05 g.) suspended in a cold solution of $KBH_4$ (e.g. 14 millimoles) dissolved in water, e.g. 70 ml.

Process No. 2

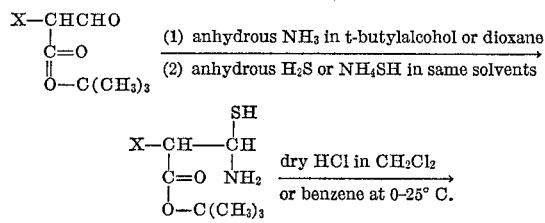

In this process X has the meaning set out above and the final step of converting the blocked amino group to a primary amino group is carried out as described above for the various definitions of group X.

Process No. 3

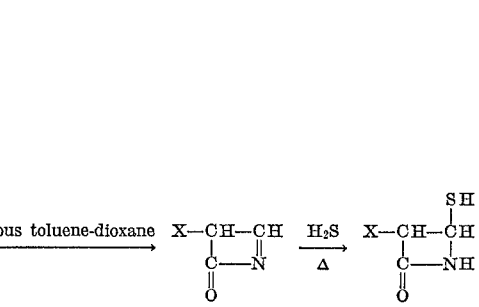

In this process X has the meaning set out above and is preferably phthalimido or carbobenzyloxyamino.

Process No. 4

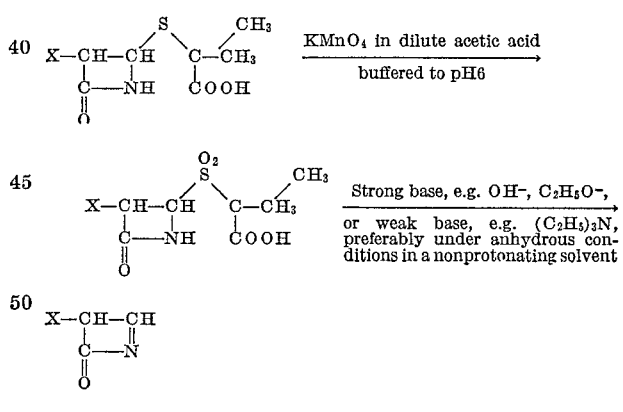

As before, X has the meaning set out above.

Process No. 5

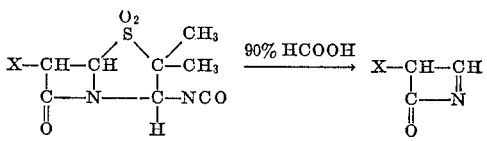

As before, X has the meaning set out above. The starting materials for this one step reaction are prepared by the methods described by Sheehan et al., J. Amer. Chem. Soc., 87, 5468–5469 (1965) for the compound in which X represents phthalimido with the addition of an oxidation of the sulfur to the sulfone stage by conventional procedures, preferably carried out on the 6-

"blocked" aminopenicillanic acid; see U.S. Patent 3,197,-466 and Chow et al., J. Org. Chem., 27, 1381-3 (1962) and references therein.

Process No. 6

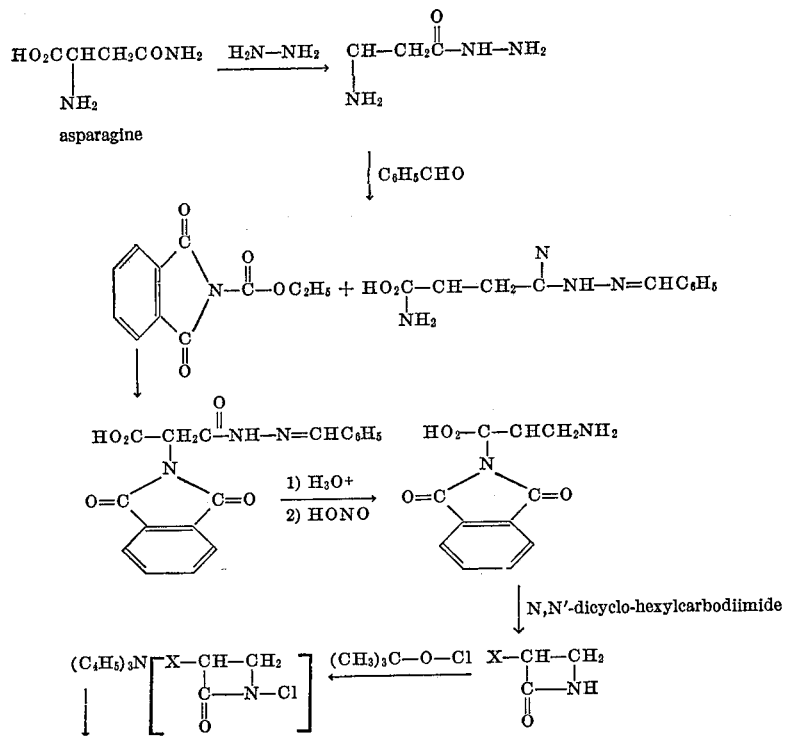

In this process X has the meaning set out above and the final step of converting the blocked amino group to a primary amino group is carried out as described above for the various definitions of group X.

The compounds of the present invention are used as intermediates in the preparation of penicillins and cephalosporins in the following ways:

Procedure No. 1

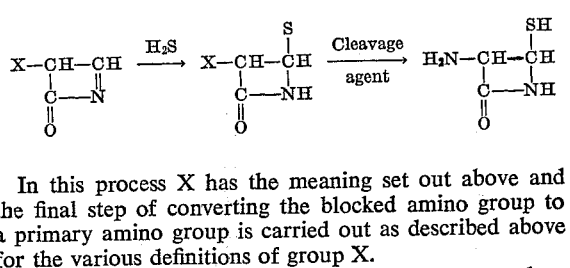

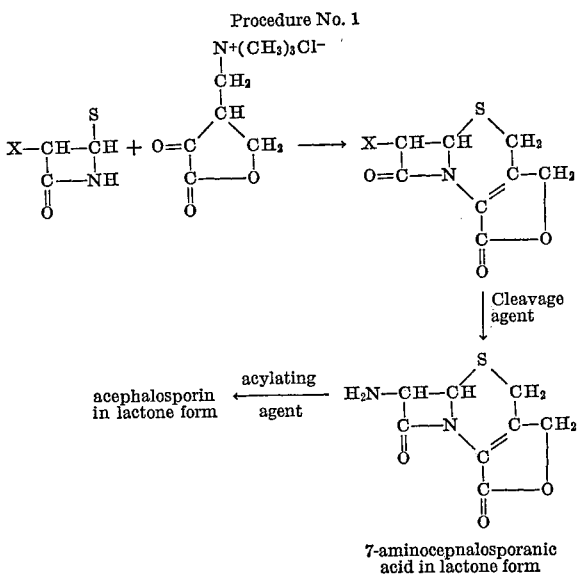

X has the meaning set out above. The cleavage agent used is as before. The acylating agents are those well-known in the penicillin and cephalosporin arts, e.g. acid chlorides.

The methods for the conversion of 7-aminocephalosporanic acid and its derivatives to one another and to the various forms of cephalosporins, as by acylating agents, are well-known in the art, as illustrated by U.S. Patents 2,658,018; 3,079,314; 3,082,155; 3,093,638; 3,117,126; 3,124,576; 3,129,224; 3,131,184; 3,134,774; 3,157,648; 3,160,631; 3,167,550; 3,173,916; 3,178,426; 3,188,311; 3,193,550; 3,196,151; 3,216,999; 3,217,000.

Procedure No. 2

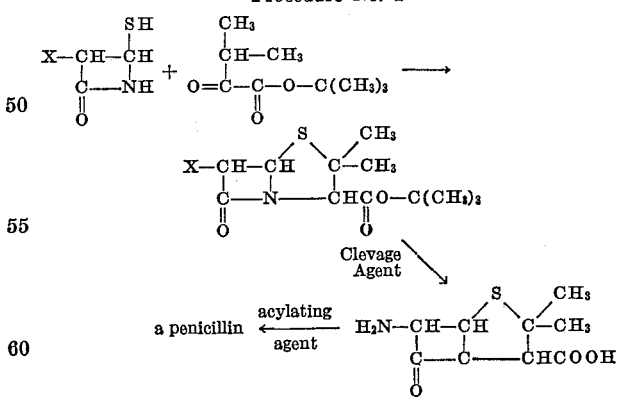

As before, X has the meaning set out above. The cleavage agents are those described above. The acylating agents are those well-known in the synthetic penicillin art, e.g. acid chlorides and anhydrides.

Procedure No. 3

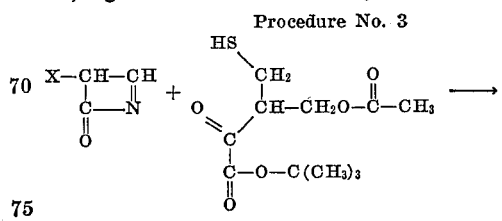

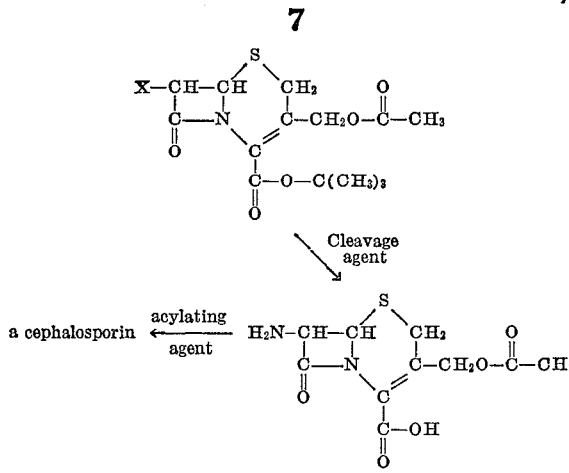

As before, X has the meaning set out above and is preferably tritylamino. The t-butyl group can be replaced by a trityl or benzhydryl group. The cleavage agents and their use are described above.

Procedure No. 4

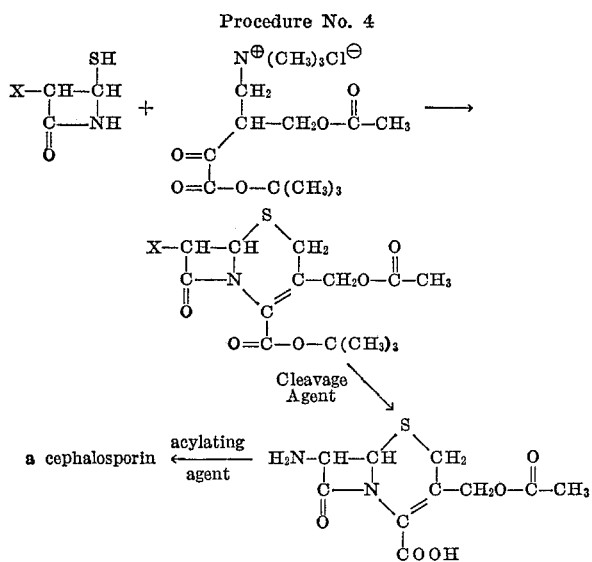

As before, X has the meaning set out above and is preferably carbo-t-butyloxyamino or tritylamino and the cleavage agents and acylating agents are as described above for the various definitions of group X.

The compounds of the present invention need not be isolated before their use in series of reactions which eventually produce penicillins, cephalosporins, 6-aminopenicillanic acid and 7-aminocephalosporanic acids and derivatives thereof. Frequently it is even preferable to prepare then in situ in the presence of the reagents with which they are to be condensed, e.g. 2,3-diketo-4-furfuryl-trimethylammonium chloride, t-butyl α-keto-isovalerate, trityl α-keto-isovalerate.

The following examples will illustrate the present invention without limiting it thereto. All temperatures are given in degrees centigrade. The infrared spectra were measured on a Perkin-Elmer Model 237 recording spectrophotometer. A Varian Associates A–60 instrument was used for recording nuclear magnetic resonance spectra and peak positions are reported in τ units (TMS=τ10).

EXAMPLE 1

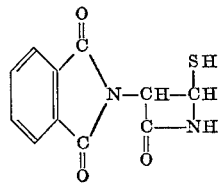

Step A.—3-phthalimido-4-(1'-formyl-1'-methylethyl-thio)-2-azetidinone

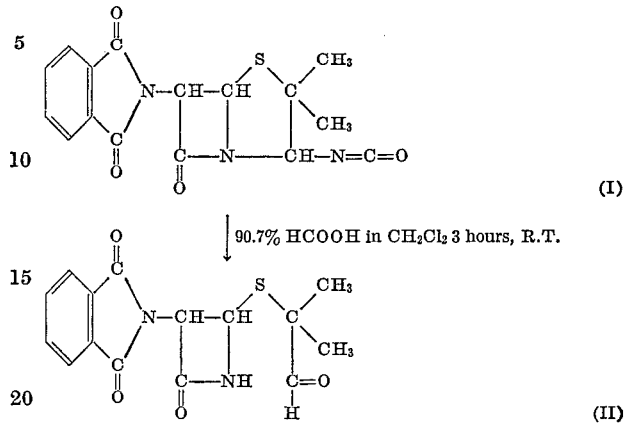

2,2-dimethyl-6-phthalimido-3-penamyl isocyanate (I) [Y. G. Perron et al., J. Med. Chem., 7, 483 (1964)] (2.0 g.) was dissolved in 150 ml. methylene chloride and added dropwise over about 20 minutes with stirring at room temperature to a solution of 2 g. of 90.7% formic acid in 150 ml. methylene chloride. After stirring was continued at room temperature for a total of 3 hours, the reaction mixture was washed with 30 ml. water and the organic phase was separated, dried over anhydrous $MgSO_4$, filtered and evaporated in vacuo to yield 1.85 g. white crystals. These crystals were slurried in 70 ml. methylene chloride and 0.3 g. insoluble material of M.P. 210° was filtered off.

The remaining, filtered methylene chloride was evaporated in vacuo to give the desired product, 3-phthalimido - 4-(1'-formyl-1'-methylethylthio)-2-azetidinone as white crystals (plates), 1.5 g., M.P. 118–120°. The infrared spectrum is in full accord with the structure (II) and is identical with the infrared absorption spectrum of the hemisolvate of (II) prepared according to the procedure of Sheehan and Brandt, J. Amer. Chem. Soc., 87, 5468–9 (1965).

I.R. (II) ($CH_2Cl_2$): 3400 (NH), 2810 and 2700 (aldehyde CH), 1790 and 1720 (phthalimido CO), 1720 (aldehyde CO), 1770 (β-lactam carbonyl) and 1385 cm.$^{-1}$ (gem-dimethyl). Recrystallization from benzene-ligroin yields crystals melting at 112–117 and having identical I.R. spectra (including the fingerprint area) with II-hemisolvate. Recrystallization from methylene chloride-petroleum ether gives a product melting at 112–114°. Mixed M.P. with II-hemisolvate (M.P. 111–119°) 110–105°.

Analysis of (II).—Calc'd for $C_{15}H_{14}N_2O_4S$: C, 56.59, H, 4.40, S, 10.00. Found: C, 56.17, H, 4.68, S, 9.60.

Chromatography of the crude aldehyde on silica gel column and elution with methylene chloride-acetone afforded white crystals melting at 115–117° and having the I.R. spectra characteristic of (II).

Step B.—3-phthalimido-4-(1'carboxy-1'-methylethylthio)-2-azetidinone

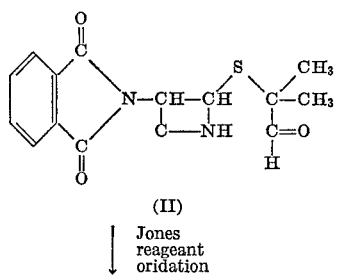

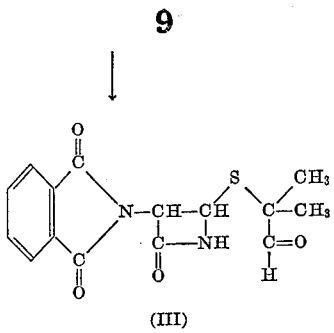

(III)

The aldehyde [(II), which was prepared above] was oxidized in acetone with Jones reagent [J. Chem. Soc., 2548 (1953)] according to the procedure used by Sheehan and Brandt, J. Amer. Chem. Soc., 87, 5468–9 (1965).

The infrared absorption spectrum of this product, 3-phthalimido - 4-(1'-carboxy-1'-methylethylthio)-2-azetidinone exhibited all the necessary carboxylic vibrations (somewhat weak broad band at 3400–3300, 1450 and 1250 cm.$^{-1}$ along with the phthaloyl and β-lactam carbonyl vibrations).

Step C.—3 - phthalimido-4-(1'-carbazido-1'-methylethylthio)-2-azetidinone

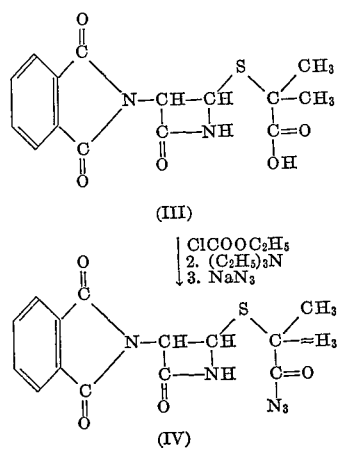

(III)

| 1. ClCOOC$_2$H$_5$
| 2. (C$_2$H$_5$)$_3$N
↓ 3. NaN$_3$ (IV)

The previous acid (III) was submitted to the Bergmann degradation under the usual conditions to produce crystalline azide (IV) which was easily identified by its infrared absorption at 2160 cm.$^{-1}$.

Thus, to a stirred solution of 3-phthalimido-4-(1'-carboxy-1'-methylethylthio)-2-azetidinone (III) (2.20 g., 6.6 mmoles) in 25 ml. of tetrahydrofuran (distilled from potassium hydroxide) was added triethylamine (distilled from potassium hydroxide) (0.67 g., 6.6 mmoles) and the resulting yellow solution was cooled to −15° C. To this stirred solution was added dropwise during one-half hour a solution of ethyl chloroformate (0.72 g., 6.6 mmoles) in 0.4 ml. tetrahydrofuran. A colorless precipitate formed and the resulting mixture was stirred at −10° for one hour. At the end of this time a solution of sodium azide (0.43 g., 6.6 mmoles) in 3.4 ml. of water was added portionwise during 5 minutes, the reaction mixture being stirred at −10° in this addition. The reaction mixture was then diluted with 25 ml. of water while being stirred at 10°. Since no crystallization occurred the yellow solution was extracted into three 100 ml. portions of methylene chloride which were washed with 100 ml. water and then dried over magnesium sulfate, filtered and evaporated under reduced pressure to yield yellowish crystals of 3-phthalimido-4-(1'-carboxy-1'-methylethylthio)-2-azetidinone azide (IV) (1.75 g., 80%), M.P. 100–120°. The infrared spectrum in microns showed bands at 3350 cm.$^{-1}$ (NH), 3050 cm.$^{-1}$ (aromatic CH), 2160 cm.$^{-1}$ (azide band), 1790, 1720 cm.$^{-1}$ (phthaloyl carbonyls), 1770 cm.$^{-1}$ (β-lactam carbonyl), 1385 cm.$^{-1}$ (gem-dimethyl).

Step D.—3-phthalimido-4-(1'-isocyano-1'-methyl-ethyl-thio)-2-azetidinone

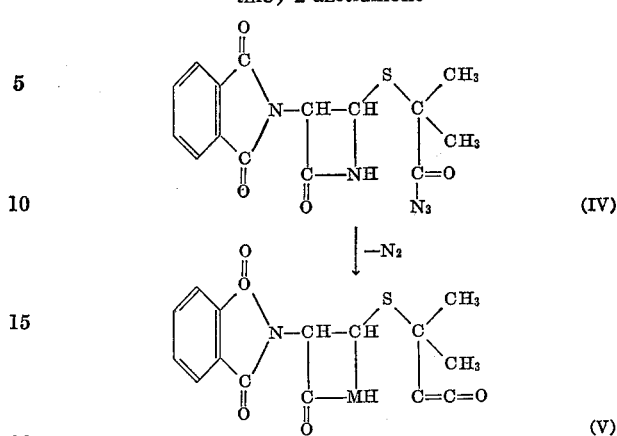

The previous azide (IV) was kept in a vacuum desiccator overnight to convert it to the isocyanate (V) which was easily identified by its characteristic absorption at 2270 cm.$^{-1}$ in the infrared. The conversion was also effected by refluxing in methylene chloride or tetrahydrofuran but even a short period of refluxing in benzene or toluene yielded a product devoid of isocyanate absorption in the infrared.

The conversion of the azide (IV) into the isocyanate did not always proceed to completion, as determined by detection of the isocyanate band at 2270 cm.$^{-1}$ in the I.R. Storage under reduced pressure for two weeks or refluxing in methylene chloride each gave a mixture of (IV) and (V)

Step E.—3-phthalimido-4-mercapto-2-azetidinone

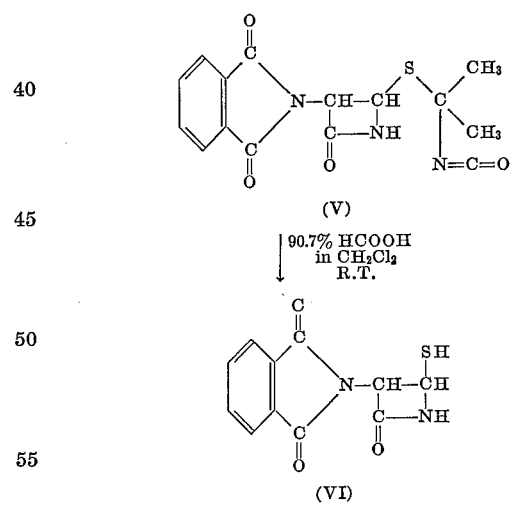

A mixture of the azide (IV) and the isocyanate (V) (0.2 g.) was dissolved in 15 ml. of methylene chloride and added dropwise with stirring and under nitrogen (during 15 minutes) to 90.7% formic acid (45 mg., about two equivalents) in 15 ml. of methylene chloride. The reaction mixture was stirred at room temperature under nitrogen for two hours. An I.R. spectrum of the reaction mixture indicated that both the isocyanate bands (2270 cm.$^{-1}$) and the azide bands (2160 cm.$^{-1}$ were substantially affected. Thereafter the reaction was carried on to a total of 4 hours whereupon the I.R. spectrum of the reaction mixture indicated the complete absence of azide and isocyanate bands.

The reaction mixture was washed with 30 ml. water, the organic layer dried over anhydrous sodium sulfate, filtered and evaporated under reduced pressure to give colorless crystals of 3-phthalimido-4-mercapto-2-azetidinone (VI) (0.14 g., 65% overall yield from the acid), M.P. 130–

131°. All these manipulations were performed under nitrogen. Qualitative test for sulfur was positive. The NMR spectrum in deuteryl chloroform showed in τ units: a singlet at 2.2τ (phthaloyl), a broader band at 4.2τ (the β-lactam protons).

I.R. spectra (CH$_2$Cl$_2$): 3350 (NH, weak), 3050 (aromatic CH), 2950 (CH), 2580 (SH, weak), 1790, 1720 (phthaloyl CO), 1770 (β-lactam, medium).

*Analysis.*—Calc'd for C$_{11}$H$_8$N$_2$O$_3$S: C, 53.21; H, 3.20; N, 11.28. Found: C, 53.01; H, 4.26; N, 10.99.

EXAMPLE 2

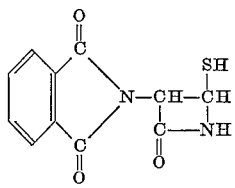

3-phthalimido-4-mercapto-2-azetidinone is prepared by substituting in the procedure of Example 1 aldehyde (II) prepared either as described by Sheehan and Brandt, J. Amer. Chem. Soc., 87, 5468–9 (1965) or by the method of Example 15, Step A below.

EXAMPLE 3

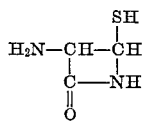

3-amino-4-mercapto-2-azetidinone.—This product is prepared by reacting 3-phthalimido-4-mercapto-2-azetidinone with one equivalent of hydrazine hydrate in dioxane at room temperature for 12 hours and then adding hydrogen chloride to precipitate phthalhydrazide, which is removed by filtration. Lyophilization of the filtrate then provides solid 3-amino-4-mercapto-2-azetidinone hydrochloride.

In the alternative, if desired, there is added to the filtrate, with optional use of a buffering agent to convert the hydrochloride to the free base, one equivalent of t-butyl α-ketoisovalerate. Upon standing there is then formed the t-butyl ester of 6-aminopenicillanic acid, which if desired, is converted, either immediately or after acylation in the usual manner to produce a pinicillin, to the free acid by treatment either with anhydrous p-toluenesulfonic acid in glacial acetic acid containing a trace of acetic anhydride or by treatment at room temperature with gaseous hydrogen chloride in dioxane.

In a second alternative, if desired, there is added to said filtrate one equivalent of phenacyl α-ketoisovalerate. Upon standing there is then formed the phenacyl ester of 6-aminopenicillanic acid which is acylated in the usual manner, e.g. with an acid chloride, to form the phenacyl ester of the corresponding penicillin and that ester is converted in turn to the penicillin itself by treatment with sodium thiophenoxide according to Sheehan and Daves, J. Org. Chem., 29, 2006–2008 (1964).

EXAMPLE 4

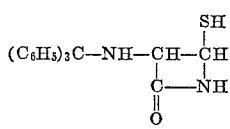

3 - tritylamino - 4-mercapto-2-azetidinone.—This compound is prepared by substituting in the procedure of Example 1 for the 2,2-dimethyl-6-phthalimido-3-penamyl isocyanate used therein an equal weight of 2,2-dimethyl-6-tritylamino-3-penamyl isocyanate prepared by the method of Perron et al., J. Med. Chem., 7, 483–487 (1964) (see also Belgian Patent 655,997 for methods of preparing the intermediate acid azides) from 6-tritylaminopenicillanic acid [see Sheehan et al., J. Amer. Chem. Soc., 84, 2983 (1962)].

Alternatively, the conversion of said isocyanate to aldehyde is carried out using the procedure of Step A in Example 15 below.

EXAMPLE 5

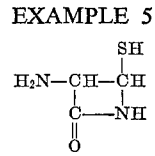

3-amino-4-mercapto-2-azetidinone.—One milligram of 3-tritylamino-4-mercapto-2-azetidinone is dissolved in 20 ml. isopropyl alcohol and 5 ml. of 1 N hydrochloric acid is added. After standing at room temperature for 2 hours the mixture is diluted with 100 ml. water and the triphenyl carbinol is removed by extraction with 400 ml. benzene. The aqueous phase containing the product, 3-amino-4-mercapto-2-azetidinone as its hydrochloride, is lyophilized to yield solid product as the hydrochloride. Treatment of the hydrochloride in solution in water with alkali, e.g. sodium hydroxide, sodium bicarbonate, liberates the free base.

If desired, the aqueous reaction phase is utilized directly for the reactions described in Example 3, with the addition of a buffering agent if desired.

EXAMPLE 6

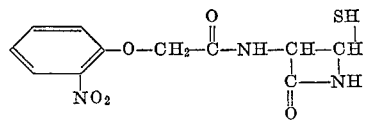

3-o-nitrophenoxyacetamido - 4 - mercapto - 2 - azetidinone.—This compound is prepared by substituting in the procedure of Example 1 beginning with Step C for the 3-phthalimido-4-(1′-carboxy-1′-methylethylthio) - 2 - azetidinone used therein an equal weight of 3-o-nitrophenoxyacetamido-4-(1′-carboxy-1′-methylethylthio) - 2 - azetidinone which has previously been prepared by acylation with o-nitrophenoxyacetyl chloride in the presence of triethylamine of 3-amino-4-(1′-carboxy-1′-methylethylthio)-2-azetidinone which in turn is prepared by reaction of hydrazine hydrate with 3-phthalimido-4-(1′-carboxy-1′-methylethylthio)-2-azetidinone.

EXAMPLE 7

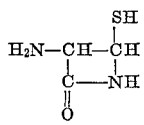

3-amino-4-mercapto-2-azetidinone.—A solution in 10 ml. water of 1.0 g. 3-o-nitrophenoxyacetamido-4-mercapto-2-azetidinone is treated with 1.0 g. prehydrogenated 30% Pd-on-diatomaceous earth and 9 ml. water under 50 p.s.i.g. hydrogen for one hour at room temperature. The solution is then adjusted to pH 2 with 50% hydrochloric acid and allowed to stand for at least twenty minutes at 5–25° C. to produce 3-amino-4-mercapto-2-azetidinone in the form of its hydrochloride.

In a variation of this procedure, the reaction is conducted under anhydrous conditions, i.e. the hydrogenation is in dry benzene and the acid is added as dry hydrogen chloride.

EXAMPLE 8

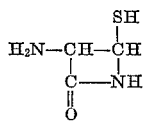

3-amino-4-mercapto - 2 - azetidinone.—To 0.75 g. (14 millimoles) of KBH$_4$ dissolved in 70 ml. water there is added 0.05 g. of 5% Pd-C. Nitrogen gas is bubbled through the suspension, which is stirred and cooled to 5° C. The pH is adjusted to between 8.0 and 8.6 by the addition of 6 N HCl and is maintained at that point while a solution of 7 millimoles of 3-o-nitrophenoxyacetamido-4-mercapto-2-azetidinone in 30 ml. water is rapidly added. The mixture is stirred cold for 15 minutes and the pH is lowered to 2.0 by the addition of 6 N HCl. The catalyst is removed by filtration to leave an aqueous solution containing the desired 3-amino-4-mercapto-2-azetidinone hydrochloride.

EXAMPLE 9

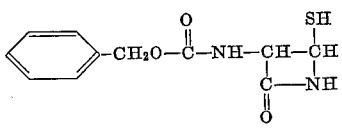

3-carbobenzyloxyamino-4-mercapto - 2 - azetidinone.—This compound is prepared by substituting in the procedure of Example 1 for the 2,2-dimethyl-6-phthalimido-3-penamyl isocyanate used therein an equal weight of 2,2-dimethyl-6-carbobenzyloxyamino - 3 - penamyl isocyanate prepared by the method of Perron et al., J. Med. Chem., 7, 483–487 (1964) (see also Belgian Patent 655,-997 for methods of preparing the intermediate acid azides) from 6-carbobenzyloxyaminopenicillanic acid.

Alternatively, the conversion of said isocyanate to aldehyde is carried out using the procedure of Step A in Example 15 below.

EXAMPLE 10

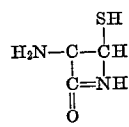

3-amino-4-mercapto-2-azetidinone.—This compound is prepared by catalytic hydrogenation of 3-carbobenzyloxyamino-4-mercapto-2-azetidinone at room temperature with a platinum catalyst in toluene as a nonprotonating solvent until one mole of hydrogen is absorbed. Filtration to remove the catalyst leaves a solution of 3-amino-4-mercapto-2-azetidinone which is isolated by lyophilization or, if desired, is reacted in situ, e.g. as illustrated in Example 3 above.

EXAMPLE 11

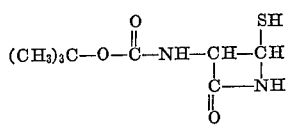

3 - carbo - t - butyloxyamino - 4 - mercapto - 2 - azetidinone.—This compound is prepared by substituting in the procedure of Example 1 for the 2,2-dimethyl-6-phthalimido-3-penamyl isocyanate used therein an equal weight of 2,2-dimethyl-6-carbo-t-butyloxyamino-3-penamyl isocyanate prepared by the method of Perron et al., J. Med. Chem., 7, 483–487 (1964) (see also Belgian Patent 655,-997 for methods of preparing the intermediate acid azides) from 6-carbo-t-butyloxyaminopenicillanic acid, which is prepared as reported in the literature, or, if desired, by the methods used to prepare 6-ethoxycarbamido-penicillanic acid.

Alternatively, the conversion of said isocyanate to aldehyde is carried out using the procedure of Step A in Example 15 below.

EXAMPLE 12

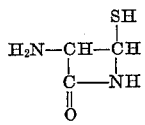

3-amino-4-mercapto-2-azetidinone.—This compound is prepared by dissolving 20 milligrams of 3-carbo-t-butyl-oxyamino-4-mercapto-2-azetidinone in 10 ml. benzene (or methylene chloride) at room temperature and passing in anhydrous hydrogen chloride to provide a solution of 3-amido-4-mercapto-2-azetidinone hydrachloride which is either used immediately or isolated in solid form by lyophilization.

EXAMPLE 13

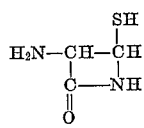

3-amino-4-mercapto-2-azetidinone.—This compound is prepared as its trifluoroacetate by dissolving 1.0 g. 3-carbo-t-butyloxyamino-4-mercapto - 2 - azetidinone in 25 ml. trifluoroacetic acid and allowing the mixture to stand at room temperature for at least 30 minutes or overnight.

EXAMPLE 14

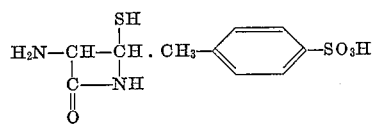

3 - amino - 4 - mercapto - 2 - azetidinone p-toluene-sulfonate.—This compound is prepared by stirring a solution of 2-millimoles of 3-tritylamino-4-mercapto-2-azetidinone and 2 millimoles p-toluenesulfonic acid monohydrate in 10 ml. dry acetone for 30 minutes at 25°. The solvent is evaporated under a stream of nitrogen and the residue is triturated with 100 ml. dry diethyl ether, which dissolves the triphenylcarbinol and leaves the 3-amino-4-mercapto-2-azetidinone p-toluenesulfonate as a solid product which is collected by filtration.

EXAMPLE 15

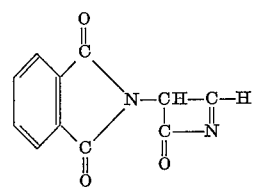

3-phthalimido-Δ$^{1,4}$-2-azetidinone

Step A.—3-phthalimido-4-(1'-formyl - 1' - methylethylthio)-2-azetidinone.—This intermediate was prepared by dropwise addition of 17 g. 2,2-dimethyl-6-phthalimido-3-penamyl isocyanate in 250 ml. methylene chloride to a mixture of 27.2 g. formic acid in 250 ml. methylene chloride over a period of 1.75 hours at room temperature and then stirring the mixture for an additional 1.25 hours. The solution was washed with water (3× 200 ml.), dried over MgSO$_4$, filtered and evaporated to give an oil which foamed under reduced pressure and solidified. This solid foam was dissolved in methylene chloride, leaving behind some impurities. Evaporation of the methylene chloride left crude, solid 3-phthalimido-4-(1'-formyl-1'-methylethylthio)-2-azetidinone which was purified by chromatography. Thus, 5 g. of the crude aldehyde was placed in chloroform on a column of 100 mesh silicic acid suspended in benzene. The first eluent used was a mixture of benzene-chloroform (1:1) and fractions of 25 ml. were collected. The column size was 5" x 1¾". Material was obtained from fractions 18–19. This compound was not the required aldehyde; I.R. showed the absence of the NH-stretching frequency and the NMR the lack of the aldehydic proton at 0.7τ. Elemental analysis of this compound, M.P. 97°, was C, 57.74; H, 4.79; N, 7.58; S, 7.74.

Continuation of the chromatography gave no further fractions using this particular eluting system. After fraction 23 the eluent was changed to chloroform which upon evaporation gave 3 - phthalimido - 4 - (1' - formyl - 1'-methylethylthio)-2-azetidinone as an oil in fractions 27–29. This oil crystallized from benzene, M.P. 117–123°, yield 2 g. The I.R. showed the presence of the NH— absorption band; the spectra was identical to that of a sample of the aldehyde produced by Sheehan and Brandt. The NMR showed two singlets for the gem-dimethyls at 8.6τ and 8.7τ. The NMR spectrum was essentially the same as that published in the literature. NMR (CDCl₃): 0.7τ (1H, singlet), 2.15τ (4H, multiplet), 2.65τ (3H, singlet benzene of solvation), 4.35τ (1H, doublet) J–5 cps., 5.12τ (1H, doublet) J–5 cps., 8.6τ (3H, singlet), 8.7τ (3H, singlet). Optical rotation of the aldehyde prepared by this method was compared with that prepared by the THF-1N-HCl method. Formic acid method [α]₅₄₆ −61.5° (3.91 in chloroform). THF-HCl method [α]₅₄₆ −64.2° (4.3 in chloroform).

Step B.—3 - phthalimido - Δ¹,⁴ - 2 - azetidinone: This product was prepared from the aldehyde above by direct elimination of the thiol by the use of a strong nucleophile. Thus, to 3 - phthalimido - 4 - (1' - formyl - 1' - methylethylthio) - 2 - azetidinone (0.8 g.) dissolved in an anhydrous mixture of dry toluene and dioxane (1:3, 40 ml.) cooled to 0° C. there was added 0.25 g. potassium t-butoxide. The reaction mixture was stirred vigorously for 45 minutes while maintaining the temperature at 0° C. Removal of the solvent under high vacuum left the product, 3 - phthalimido - Δ¹,⁴ - 2 - azetidinone as a yellow solid. This product is insoluble in diethyl ether and soluble in methylene chloride. Washing the product with diethyl ether removed residual, unreacted aldehyde, as shown by I.R.

The infrared absorption spectrum of 3 - phthalimido-Δ¹,⁴-2-azetidinone showed the absence of the —NH absorption maximum and the appearance of the maximum at 1600 cm.⁻¹ indicative of the C=N bond. There were also absorption maxima at 1775 and 1715 cm.⁻¹ (phthalimido) and at 1765 cm.⁻¹ (β-lactam carbonyl).

The action of water on this compound caused loss of the C=N as shown in the infrared absorption spectrum.

EXAMPLE 16

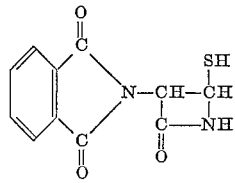

3 - phthalimido - 4 - mercapto - 2 - azetidinone.— Equimolar mixtures of 3-phthalimido-Δ¹,⁴-2-azetidinone and anhydrous hydrogen sulfide in benzene, methylene chloride and dioxane, respectively, in pressure vessels when heated for 1, 6, 12, 24 and 48 hours, respectively, at 40°, 60°, 80° and 100°, respectively, produce varying amounts of 3 - phthalimido - 4 - mercapto - 2 - azetidinone which are used directly for further reaction or isolated in solid form by removal of the solvent by lyophilization.

EXAMPLE 17

Substitution in the procedure of Example 15 for the 2,2 - dimethyl - 6 - phthalimido - 3 - penamyl isocyanate used therein of an equal weight of 2,2-dimethyl-6-tritylamino-3-penamyl isocyanate,
2,2-dimethyl-6-carbobenzyloxyamino-3-penamyl isocyanate,
2,2-dimethyl-6-o-nitrophenoxyacetamido-3-penamyl isocyanate,
2,2-dimethyl-6-formylamino-3-penamyl isocyanate,
2,2-dimethyl-6-carbo-t-butyloxyamino-3-penamyl isocyanate, and
2,2-dimethyl-6-o-nitrophenylsulfenylamino-3-penamyl isocyanate, respectively, produces 3-tritylamino-Δ¹,⁴-2-azetidinone,
3-carbobenzyloxyamino-Δ¹,⁴-2-azetidinone,
3-o-nitrophenoxyacetamido-Δ¹,⁴-2-azetidinone,
3-formylamino-Δ¹,⁴-2-azetidinone, and 3-o-nitrophenylsulfenylamino-Δ¹,⁴-2-azetidinone, respectively.

Substitution in the procedure of Example 16 for the 3 - phthalimido - Δ¹,⁴ - 2 - azetidinone used therein of an equal weight of each of the above products in turn produces 3-tritylamino-4-mercapto-2-azetidinone,
3-carbobenzyloxyamino-4-mercapto-2-azetidinone,
3-o-nitrophenoxyacetamido-4-mercapto-2-azetidinone,
3-formylamino-4-mercapto-2-azetidinone,
3-carbo-t-butyloxyamino-4-mercapto-2-azetidinone, and
3-o-nitrophenylsulfenylamino-4-mercapto-2-azetidinone, respectively.

EXAMPLE 18

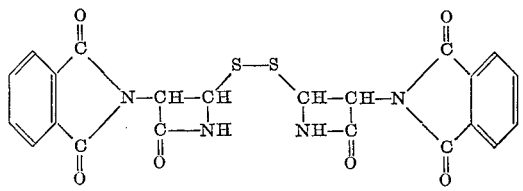

The solid disulfide is produced in moderate amounts as a by-product in the reaction of Step E, Example 1 and is recovered from the mother liquors remaining after purification of the 3-phthalimido-4-mercapto-2-azetidinone by fractional recrystallization, e.g. from methylene chloride-ether or benzene-petroleum ether and similar systems.

This disulfide is converted to 3-amino-4-mercapto-2-azetidinone by the following methods, of which the first is preferred:

(A) Catalytic hydrogenation.—A solution of 10 mgm. disulfide in 10 ml. benzene is hydrogenated at room temperature using a large excess of palladium or platinum catalyst, i.e. 100 mgm. of palladium black. The catalyst is then removed by filtration and the solvent by evaporation in an inert atmosphere to leave as the residue the desired 3-amino-4-mercapto-2-azetidinone.

(B) Mercaptan interchange.—Solutions of 50 mgm. disulfide in 20 ml. ethyl mercaptan are held for 1, 6, 12, 24 and 48 hours, respectively, at temperatures of 30°, 40°, 50° and 60° respectively, using sealed tubes where necessary, and the reaction mixtures are then distilled in high vacuum to remove the ethyl mercaptan and the diethyl disulfide and leave as the residue varying yields of the desired 3-amino-4-mercapto-2-azetidinone.

(C) Borohydride reduction.—Solutions of disulfide in benzene, methylene chloride, methanol, water and dioxane are reduced with sodium borohydride at 0–25° C. to produce 3-amino-4-mercapto-2-azetidinone.

EXAMPLE 19

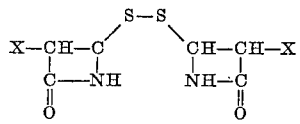

The disulfides of the formula above in which X represents tritylamino, o-nitrophenoxyacetamido, carbobenzyloxyamino and carbo-t-butyloxyamino, respectively, are likewise formed as by-products in the final step of Examples 4, 6, 9 and 11 respectively, and are recovered in the manner described in Example 18 for the recovery of the disulfide in which the blocking group X is phthalimido.

Following the procedures for splitting disulfides set forth in Example 18, these disulfides are converted to 3-tritylamino-4-mercapto-2-azetidinone,
3-o-nitrophenoxyacetamido-4-mercapto-2-azetidinone,
3-carbobenzyloxyamino-4-mercapto-2-azetidinone, and
3-carbo-t-butyloxyamino-4-mercapto-2-azetidinone, respectively, or directly to 3-amino-4-mercapto-2-azetidinone depending upon the reagent used.

In one embodiment of the present invention use is made as a blocked amino group of o-nitrophenylacetamido, which has the structure

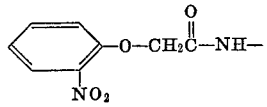

Equally useful groups which are handled in the same manner are the groups having the formulae

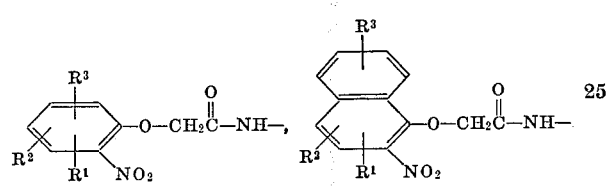

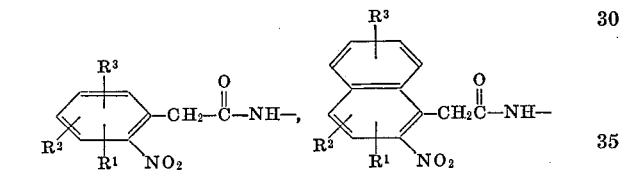

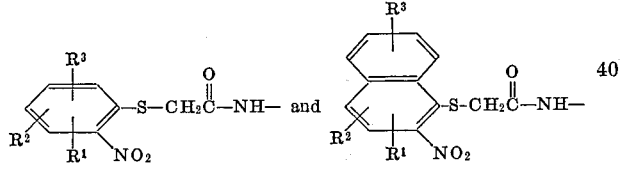

wherein $R^1$, $R^2$ and $R^3$ are each hydrogen, (lower)alkyl, (lower)alkoxy, chloro, bromo, iodo, trifluoromethyl, cyano or methylsulfonyl.

The intermediates having the formula

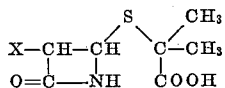

where X has the meaning set out above are also prepared by the usual methods of putting such groups in place on a primary amino group of an amino acid, e.g. by use of o-nitrophenoxyacetyl chloride or trityl chloride, utilizing the intermediate of the formula

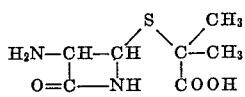

whose properties and preparation by reaction of hydrazine hydrate upon 3-phthalimido-4-(1'-carboxy-1'-methylethylthio)-2-azetidinone have been described by Karl G. Brandt, Ph.D. Thesis, Massachusetts Institute of Technology, Cambridge, Mass., August 1964.

While in the foregoing specification various embodiments of this invention have been set forth in specific detail and elaborated for the purpose of illustration, it will be apparent to those skilled in the art that this invention is susceptible to other embodiments and that many of the details can be varied widely.

I claim:
1. A compound having the formula

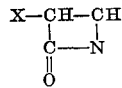

wherein X represents phthalimido, tritylamino, o-nitrophenoxyacetamido, o - nitrophenylsulfenylamino, carbobenzyloxyamino, formylamino or carbo-t-butyloxyamino.

2. The compound having the formula

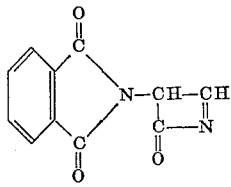

3. The compound having the formula

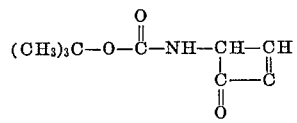

4. The compound having the formula

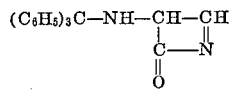

5. A compound having the formula

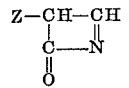

wherein Z represents the groups having the formulae

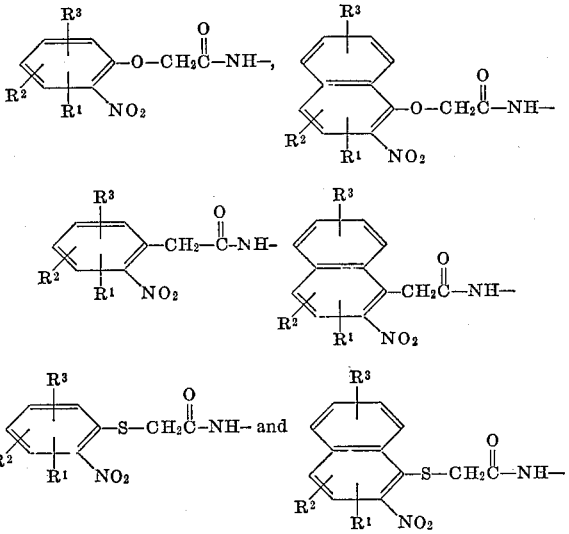

wherein $R^1$, $R^2$ and $R^3$ are each hydrogen, (lower)alkyl, (lower)alkoxy, chloro, bromo, iodo, trifluoromethyl, cyano or methylsulfonyl.

6. The process for the preparation of a compound of the formula

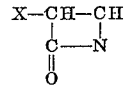

wherein X represents phthalimido, tritylamino, o-nitrophenoxyacetamido, o - nitrophenylsulfenylamino, carbobenzyloxyamino, formylamino or carbo-t-butyloxyamino which comprises mixing a compound of the formula
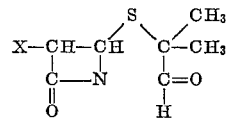
wherein X represents the same group and potassium t-butoxide in anhydrous toluene-dioxane.
References Cited
UNITED STATES PATENTS
3,275,626  9/1966  Morin et al.
HENRY R. JILES, Primary Examiner
S. D. WINTERS, Assistant Examiner
U.S. Cl. X.R.
260—326